3,170,950
N-t-BUTYL-1,4-BUTANEDIAMINE AND
SALTS THEREOF
Robert W. Fleming, Ann Arbor, Mich., assignor to Parke,
Davis & Company, Detroit, Mich., a corporation of
Michigan
No Drawing. Filed Oct. 9, 1961, Ser. No. 143,594
7 Claims. (Cl. 260—501)

The present invention relates to novel diamine products having useful pharmacodynamic properties and to means for producing these compounds. More particularly, the invention relates to N-t-butyl-1,4-butanediamine and acid addition salts thereof.

In accordance with the invention, N-t-butyl-1,4-butanediamine is produced by subjecting 4-t-butylaminobutyronitrile to reduction and isolating the product of reduction in either the free base or acid addition salt form. According to one preferred embodiment of the invention, 4-t-butylaminobutyronitrile is reacted with lithium aluminum hydride in an anhydrous non-hydroxylic organic solvent and the reaction product is subjected to decomposition by treatment with an aqueous medium. The amount of lithium aluminum hydride required for the reaction is not critical and may be varied. For convenience, equivalent amounts of the amino nitrile and lithium aluminum hydride can be employed, and preferably the lithium aluminum hydride is employed in excess. For best results the reactants are combined slowly in such a manner as not to exceed the rate of reaction. The temperature during reaction is subject to considerable variation. Good results are obtained at temperatures in the range from about 0° C. to about 50° C., and for best results temperatures in the range from 15 to 35° C. are employed. Among various inert solvents which are suitable for the reaction may be mentioned the cyclic and acyclic ethers such as diethyl ether, dioxane, tetrahydrofurane and the like and mixtures of these solvents with hydrocarbons such as benzene, toluene, xylene and the like. Following reaction with lithium aluminum hydride, the reaction mixture is decomposed with an aqueous medium such as water, dilute aqueous inorganic acids or bases and other media containing water. While in ordinary practice an excess of the aqueous medium is added, the amount of water present should be at least four moles for each mole of lithium aluminum hydride.

According to another embodiment, reduction of 4-t-butylaminobutyronitrile is accomplished by subjecting the same to reduction with hydrogen in the presence of ammonia and a metal hydrogenation catalyst such as nickel, cobalt, rhodium and the like. Although any of a number of different metal hydrogenation catalysts can be used, a Raney nickel catalyst is preferred. Suitably, the reduction is carried out at temperatures in the approximate range of 50 to 100° C. and preferably in the range from 60 to 80° C. The hydrogen pressure for the reaction can be varied and conveniently may be in the range from about 50 to 150 atmospheres and preferably from 100 to 120 atmospheres.

In another embodiment of the invention, N-t-butyl-1,4-butanediamine is produced by subjecting 4-t-butylaminobutyronitrile to reduction by means of nascent hydrogen generated in the reaction mixture by the interaction of an alkali metal such as sodium, potassium and the like in a lower aliphatic alcohol such as ethanol, isopropanol, butanol and the like. Reduction is accomplished preferably with sodium in the presence of ethanol and for best results at reflux temperature.

The free base product of the invention, N-t-butyl-1,4-butanediamine, forms acid addition salts from reaction with organic and inorganic acids. Some examples of the acid addition salts of the invention are the inorganic acid salts such as the hydrochloride, hydrobromide, hydroiodide, sulfate and phosphate and organic acid salts such as the carbonate, succinate, benzoate, acetate, citrate, malate, maleate, p-toluenesulfonate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where solid and essentially neutral product forms, as well as increased water solubility, are desired. The invention contemplates the acid salts broadly. Those salts which are unsuited to particular uses, as for example uses where toxicity is a problem, are useful as intermediates, being readily convertible to non-toxic acid salts by means which per se are known to those in the art.

The products of the invention possess outstanding ganglionic blocking activity as well as hypotensive activity when administered by either the parenteral or oral routes. For example, it has been established by the test procedure of Chen et al., Arch. Int. Pharmacodyn., 96, 291 (1954), that an intravenous dose of less than one mg./kg. in the dog serves to block 50% of the pressor response induced by a standard dose of dimethylphenylpiperazinium iodide. The products of the invention are relatively non-toxic and hence have application as ganglionic blocking agents or hypotensive agents.

The invention is illustrated by the following examples:

*Example 1*

(a) A solution of 56 g. of 4-t-butylaminobutyronitrile in an equal volume of dry ether is added dropwise over 1 hour into a solution of 19.0 g. of lithium aluminum hydride in approximately 1 liter of dry ether. The mixture is refluxed and stirred for an additional three hours, then decomposed by the cautious addition, successively, of 20 ml. of water, 15 ml. of 20% sodium hydroxide solution and 60 ml. of water. After filtering off the salts, the product, N-t-butyl-1,4-butanediamine, is precipitated as the dihydrochloride salt by the addition of excess isopropanolic hydrogen chloride. The product is collected and recrystallized by suspending in approximately 500 ml. of isopropanol, heating to the boil, adding just enough methanol to yield a clear solution, and collecting and drying the crystals which separate on cooling; M.P. 217.5–218° C.

A water-soluble dihydrobromide is obtained by treating an ethereal solution of the free base with two equivalents of hydrogen bromide in isopropyl alcohol. The sulfuric acid salt is obtained by dissolving the free base in ethanol containing an equimolar quantity of sulfuric acid and recovering the precipitate formed by filtration and recrystallization from isopropanol.

The starting material for the process of 1a above can be prepared as follows:

(b) A solution of 750 ml. of t-butylamine in 1500 ml. of dry benzene is heated to reflux in a 3-neck flask equipped with stirrer, addition funnel and an efficient condenser. To this solution is added 454 g. of 4-bromobutyronitrile at such a rate as to maintain a slow steady reflux. Addition usually requires approximately one hour. Heating with stirring is continued overnight (20 hours) to complete the reaction. After cooling to room temperature, 600 ml. of water is added and the aqueous layer is drawn off. The organic layer is diluted with 600 ml. of ether and washed with four 300-ml. portions of water. The washings are combined with the primary aqueous layer and strongly basified with a good excess of NaOH (6–8 moles). The organic material is extracted into 1 liter of ether and the solution washed well with four 400-ml. portions of water. This ether extract and the original benzene-ether solution are combined, dried over anhydrous magnesium sulfate and filtered. The filtrate is distilled through a Vigreux column to give 4-t-butylaminobutyronitrile as a fraction boiling at 102–105° C./19 mm.

*Example 2*

4-t-Butylaminobutyronitrile (420 g.), liquid ammonia (200 ml.) and Raney nickel W7 (25 g.) are mixed in a 1 liter rotating autoclave pre-cooled with solid carbon dioxide in alcohol. The autoclave is charged to 110 atmospheres with hydrogen and heated to 60–65° C. The absorption of hydrogen is rapid and when the pressure falls to approximately 40 atmospheres, the autoclave is recharged with hydrogen. Total hydrogenation time is approximately 6 hours. Following hydrogenation, the reaction mixture is subjected to distillation under reduced pressure. The product, N-t-butyl-1,4-butanediamine, is obtained as the fraction boiling at 80–82° C./15 mm.

The product (400 g.) is dissolved in isopropanol (2 liters) and to it is added a saturated solution of hydrogen chloride in methyl alcohol until faintly acid (less than 500 ml.). N-t-butyl-1,4-butanediamine dihydrochloride which precipitates as a white crystalline solid after a few minutes is collected by filtration; M.P. 215–218° C.

A water-soluble dicitrate is obtained by mixing a solution of the free base in methanol with a solution of two equivalents of citric acid in methanol and concentrating the mixture to a small volume.

*Example 3*

A solution of 28 g. of 4-t-butylaminobutyronitrile in 400 ml. of hot absolute ethanol is treated with 36 g. of sodium metal added as rapidly as possible in small pieces. After the sodium completely reacts, the solution is concentrated to a small volume by distillation under vacuum and the residue is transferred into approximately 200 ml. of cold water. The resulting strongly basic solution is extracted successively with three 250-ml. portions of ether and the combined ether extracts are washed once with 100 ml. of cold water. After drying over potassium carbonate, the ether is removed by distillation and the product, N-t-butyl-1,4-butanediamine, is obtained as the fraction boiling at 80–82° C./15 mm.

I claim:
1. A compound of the class consisting of N-t-butyl-1,4-butanediamine and its acid addition salts.
2. An acid addition salt of N-t-butyl-1,4-butanediamine.
3. N-t-Butyl-1,4-butanediamine dihydrochloride.
4. N-t-Butyl-1,4-butanediamine dihydrobromide.
5. N-t-Butyl-1,4-butanediamine dicitrate.
6. N-t-Butyl-1,4-butanediamine sulfate.
7. N-t-Butyl-1,4-butanediamine.

References Cited in the file of this patent
UNITED STATES PATENTS

| | | |
|---|---|---|
| 2,436,368 | Weber et al. | Feb. 17, 1948 |
| 2,576,311 | Schlesinger et al. | Nov. 27, 1951 |
| 2,790,804 | Silverstone | Apr. 30, 1957 |

OTHER REFERENCES

Beilstein: vol. IV, 2nd Supp. (1942), pages 702, 703.

Overberger et al.: Chem. Abst., vol. 46 (1952), vol. 46, col. 2477.

Panaschenko: Chem. Abst., vol. 51 (1957), col. 7587, vol. 50 (1956), col. 6685.